United States Patent [19]

Chong et al.

[11] Patent Number: 4,730,227
[45] Date of Patent: Mar. 8, 1988

[54] DISK FILE ACTUATOR WITH COMBINED CARRIAGE RAIL AND ISOLATOR MOUNT FOR DRIVE MAGNET

[75] Inventors: Darryl G. Chong, San Jose; Burford J. Furman, Palo Alto; Edward L. Mathurin, Los Gatos; Thomas J. Rajac, Gilroy, all of Calif.

[73] Assignee: International Business Machines Corporation, Armonk, N.Y.

[21] Appl. No.: 58,075

[22] Filed: Jun. 4, 1987

Related U.S. Application Data

[63] Continuation-in-part of Ser. No. 683,752, Dec. 19, 1984, abandoned.

[51] Int. Cl.⁴ .......................... G11B 5/55; G11B 21/08
[52] U.S. Cl. ......................................... 360/106; 310/13
[58] Field of Search ............................... 360/104–106; 310/12, 13, 27

[56] References Cited

U.S. PATENT DOCUMENTS

| | | | |
|---|---|---|---|
| 3,612,395 | 10/1971 | English | 310/12 X |
| 3,735,163 | 5/1973 | Dijkstra et al. | 310/13 |
| 3,886,595 | 5/1975 | Swaim et al. | 360/106 |
| 4,415,941 | 11/1983 | Gibeau et al. | 360/106 |

FOREIGN PATENT DOCUMENTS 59-210576  11/1984  Japan ................................. 360/106

*Primary Examiner*—Stuart N. Hecker
*Assistant Examiner*—Benjamin E. Urcia
*Attorney, Agent, or Firm*—Pollock, VandeSande and Priddy

[57] ABSTRACT

An apparatus is disclosed for actuating the read-write heads of a disk file in which a plurality of support rails having resilient bushings at either end support on their central portions a carriage for the read-write heads and on their resilient bushings the support structure for the magnets which drive the carriage during operation. Reaction forces arising in the magnets are thereby isolated from the support rails and the frame.

12 Claims, 8 Drawing Figures

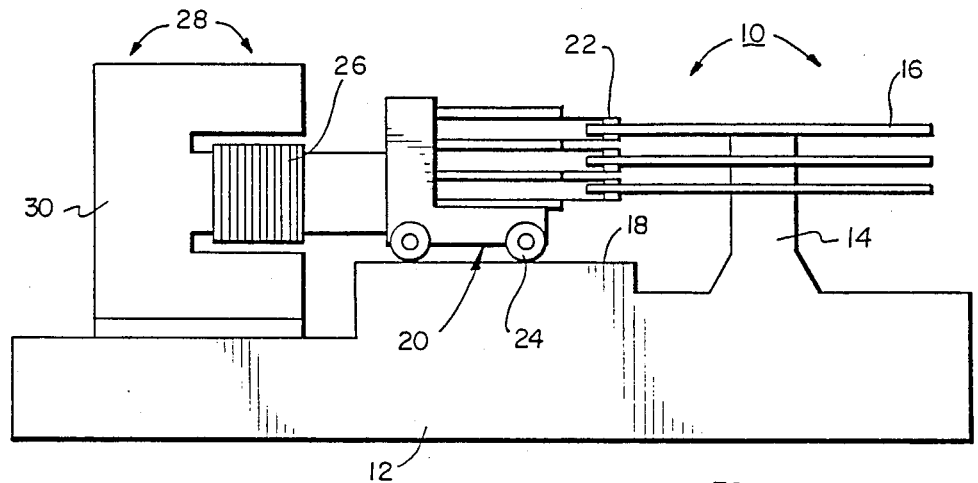
FIG 1-PRIOR ART
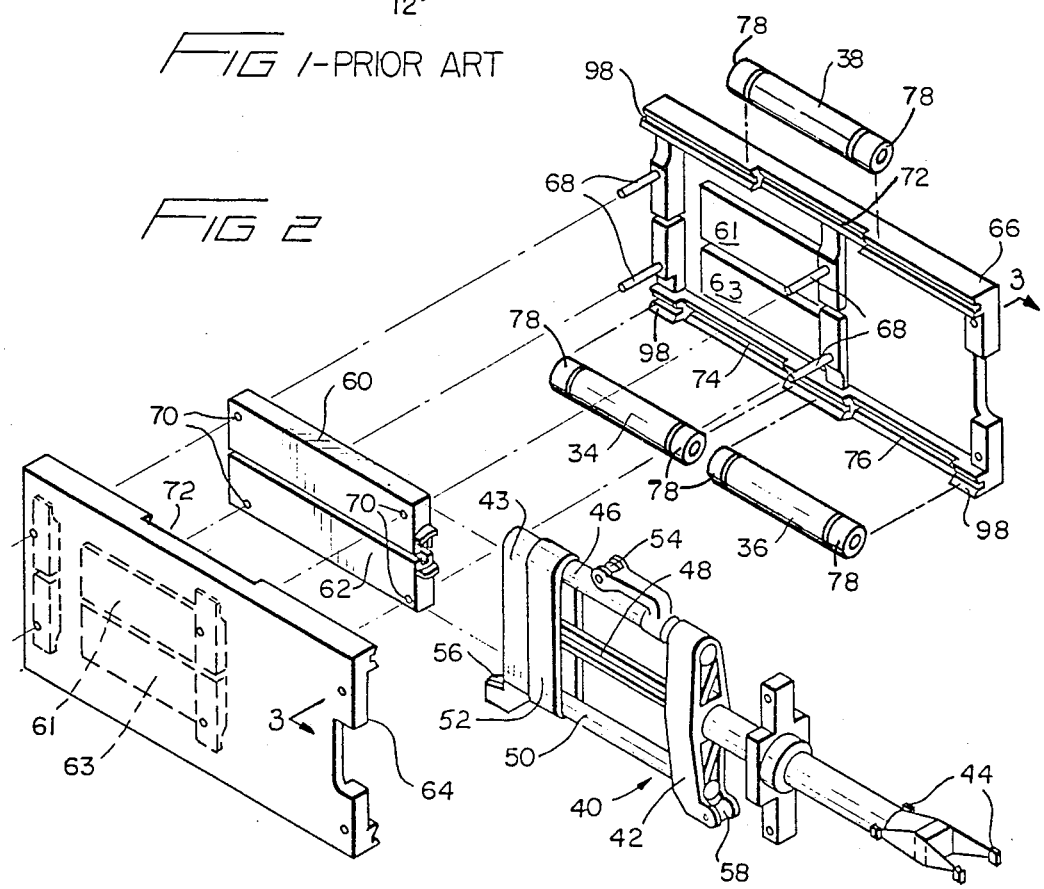
FIG 2

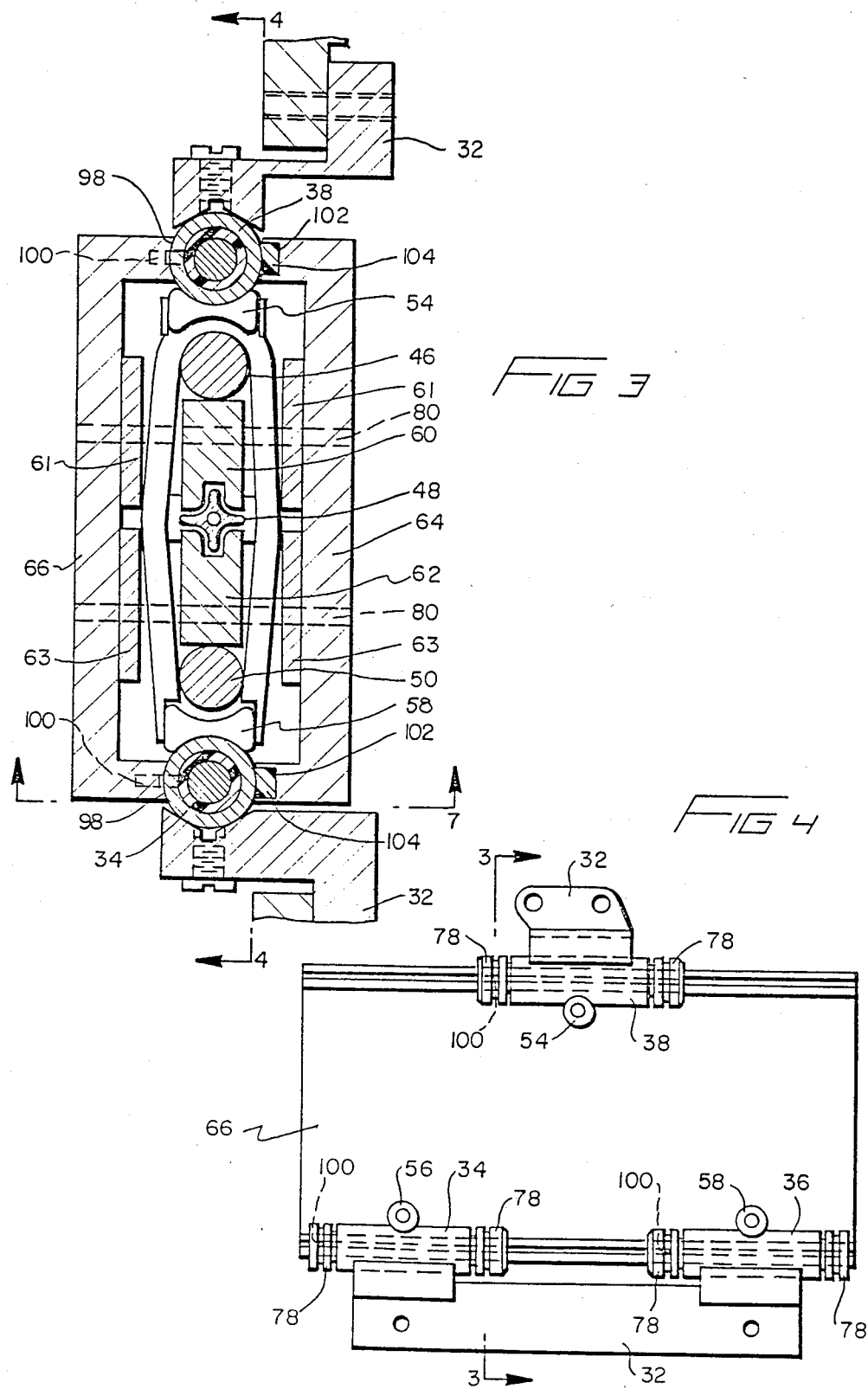

DISK FILE ACTUATOR WITH COMBINED CARRIAGE RAIL AND ISOLATOR MOUNT FOR DRIVE MAGNET

DESCRIPTION

This is a continuation in part of application Ser. No. 683,752 filed Dec. 19, 1984, now abandoned.

TECHNICAL FIELD

The invention concerns apparatuses, known as disk file actuators, for accurately positioning the read-write heads of a disk file so that data can be read from or written on a disk. More particularly, the invention concerns an improved apparatus for isolating the read-write heads and the disks of the disk file from vibration caused by reaction forces which arise in the magnets of the linear motor which moves the heads.

PRIOR ART

For a considerable number of years, electronic data processing and computing systems have included disk files in which extremely large amounts of data can be written on or read from one or more rotatable disks of a suitable data receiving medium, but means of electromagnetic read-write heads moved over the surface of the disk or, much more recently, by means of optical read-write heads similarly moved relative to the disks. In either case, the extremely high density of the information stored on a disk has required that the read-write heads be moved and positioned with great accuracy relative to the disk to ensure that data can be precisely read from or written on the disk.

FIG. 1 of this specification illustrates schematically such a prior art disk file 10. A frame or base 12 is provided which supports a rotatable spindle 14 on which one or more data storage disks 16 are supported to be rotated with the spindle by a suitable drive motor, not illustrated. A guide track 18 is provided on the frame 12 to support a carriage 20 from which one or more suitable read-write heads 22 extend. When carriage 20 is moved back and forth on rollers 24 engaged with guide track 18, heads 22 move radially inward and outward along the surfaces of disks 16 to permit reading and writing of information. Attached to carriage 20 is an electrically conductive coil 26 which is included in a linear drive motor 28 such as a voice coil motor, the motor having an electromagnetic core 30 whose field interacts with that of the coil 26 when the coil is electrically actuated, thereby causing the carriage 20 to translate back and forth as required to properly position heads 22 relative to disks 16. Collectively, carriage 20, guide track 18 and linear motor 28 are often referred to as a disk file actuator. U.S. Pat. No. 4,393,425 granted to Wright discloses an actuator of this general type.

A relatively common difficulty with disk file actuators of this type is that when coil 26 is actuated by passing electrical current therethrough, not only does the interaction of magnetic fields cause carriage 20 to move in the desired direction along track 18; but also, an equal and opposite reaction force arises within the core 30. This force, if transmitted at the appropriate frequency through the frame 12, can cause vibration between read-write heads 22 and disks 16, thereby degrading the ability of the apparatus to accurately position the read-write heads, or causing the heads to fail to read or write data, or both.

The existence of such unwanted vibration between the read-write heads and the disks has been noted for many years. A variety of structural modifications have been proposed for isolating the read-write heads and the disks from adverse effects of the reaction forces generated in the magnets of the linear motor. In general, some sort of resilient mounting has been provided for the linear motor so that the reaction forces generated in the motor are isolated from the frame of the disk file, thereby minimizing the generation of unwanted vibration between the read-write heads and the disks. For example, in disk file actuators embodying a hollow cylindrical magnet within which a carriage having an electrical coil is caused to translate, it has been suggested to mount the cylindrical magnet at either end using annular, resilient flexures which extend between the magnet and the frame of the disk file.

In U.S. Pat. No. 4,144,466 granted to Hatch, vibrations of the moving coil of a disk actuator are isolated from the read-write heads by securing the coil to the support structure for the heads using an annular layer of elastomeric material. Due to the presence of this layer of elastomeric material, longitudinal resonances and vibrations are significantly damped. In U.S. Pat. No. 4,216,505 granted to Grant et al, a somewhat different problem is addressed in that vibrations of a magnetic transducer head are directly isolated by connecting the support for the transducer head to a surrounding housing by means of a visco-elastic layer extending between the support and the housing. In U.S. Pat. No. 4,389,688 granted to Higashiyama, and U.S. Pat. No. 4,408,238 granted to Hearn, structures are disclosed for supporting a read-write head in such a manner as to damp out various vibrations. In an article entitled "High-Capacity Disc Drive Servomechanism Design" published by Stephen A. Edwards in the January 1984 issue of the *Hewlett-Packard Journal* at pages 23–27, a technique for isolating read-write heads from reaction forces is disclosed in which the linear motor is mounted on the base of the disk file by means of a shock mount comprising a vulcanized sandwich of two aluminum plates with a specially formulated butyl rubber bonded between the plates.

While such prior art attempts to reduce vibration in disk files have achieved a certain measure of success, continued advances in the design of smaller more compact disk files and disk actuators have created a continuing need for simple, compact, reliable and inexpensive devices for isolating the read-write heads and the disks from vibration arising from reaction forces generated in the motor of the disk actuator.

SUMMARY OF THE INVENTION

The object of the present invention is to provide an improved disk file actuator in which the read-write heads and disks of the disk file are isolated from vibrations caused by reaction forces in the drive motor of the disk file actuator.

Yet another object of the invention is to provide such an actuator which is simple and compact and which combines the supports or rails for the carriage of the disk file actuator with a means for isolating the heads and disks from such vibration.

These objects of the invention are given only by way of illustrative examples; thus, other desirable objectives and advantages inherently achieved by the disclosed invention may occur or become apparent to those skilled in the art. Nonetheless the scope of the invention is to be limited only by the appended claims.

In accordance with the invention, an improved apparatus is provided for actuating the read-write heads in a disk file. At least one support rail is mounted on a frame and a carriage for supporting the read-write heads is mounted on the support rail by means such as a plurality of small rollers. An electrically conductive coil is mounted on the carriage and at least one permanent magnet or electromagnet is positioned for electromagnetic interaction with the coil to cause the carriage to move along a path relative to the support rail upon electrical actuation of the coil. In accordance with the improvement of the invention, resilient means are provided which extend from the support rail to the structure which positions the magnet. Thus, the magnet and its positioning structure are supported resiliently on the support rail so that reaction forces arising in the magnet upon electrical actuation of the coil are effectively attenuated. As a result, the frame of the actuator is isolated from deleterious effects of such reaction forces.

In accordance with the preferred embodiment of the invention, the support rail for the carriage comprises an elongated, right cylindrical central portion which extends essentially parallel to the path of movement of the carriage and cooperates with the rollers supporting the carriage. At the opposite ends of this central portion are provided axially extending end portions on which are mounted the previously mentioned resilient means. Preferably, the resilient means comprises a bushing surrounding each of the end portions and a layer of elastomeric material extending between the end portions and the bushings. Preferably, the elastomeric material is bonded to the end portions and bushings. To simplify manufacture of this resilient means, the elastomeric material can also be bonded to an inner sleeve which is press fitted onto the axially extending end portion.

The magnet of the linear motor for moving the carriage is positioned between and attached to a pair of plate members disposed on either side of the carriage. The previously described resilient means on the opposite ends of the support rails are gripped between these plate members so that the axially directed reaction forces arising in the magnets are transmitted through the plate members to the resilient means but are isolated from the support rails and the frame by the elastomeric material.

BRIEF DESCRIPTION OF THE DRAWINGS

The foregoing and other objects, features and advantages of the invention will be apparent from the following more particular description of the preferred embodiments of the invention, as illustrated in the accompanying drawings.

FIG. 1 shows a schematic illustration of a prior art type of disk file.

FIG. 2 shows an exploded, perspective view of an apparatus in accordance with the invention for actuating the read-write heads of a disk file.

FIG. 3 shows a sectional, elevation view of the assembled apparatus of FIG. 2, taken along line 3—3 of FIGS. 2 and 4.

FIG. 4 shows a view taken along line 4—4 of FIG. 3 with the magnets and carriage removed for purposes of illustration.

DESCRIPTION OF THE PREFERRED EMBODIMENT

Figure 5:
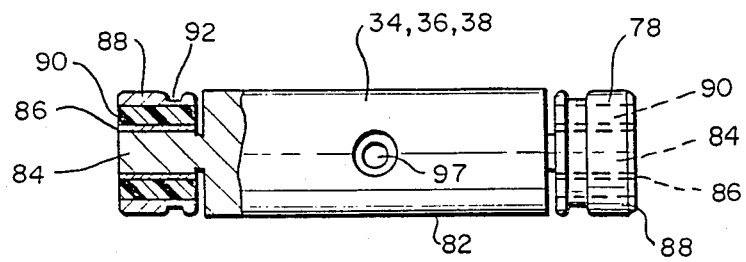
FIGS. 5 and 6 show elevation views, partially in section, of the combined support rail and resilient mounting bushing in accordance with the invention.

The following is a detailed description of the preferred embodiments of our invention, reference being made to the drawings in which the same reference numerals identify the same elements of structure in each of the several Figures.

With reference to FIGS. 2, 3 and 4, those skilled in the art will understand that the apparatus according to the invention is supported by a frame 32, shown fragmentarily in FIGS. 3 and 4, which typically would be attached to the enclosure for the overall disk file. Frame 32 is attached at spaced locations to a pair of axially separated lower support rail assemblies 34, 36 and a single upper support rail assembly 38. Though the terms "upper" and "lower" are used in this specification to refer to the relative positions of various components as seen in the drawings, those skilled in the art will understand the illustrated disk file actuator can be used in orientations where the same components may be more or less side by side rather than one above the other as illustrated. Between support rail assemblies 34, 36 and 38, a carriage 40 is supported for translation back and forth thereon. Carriage 40 comprises a forward body portion 42 and a rear body portion 43. Body portion 42 supports one or more magnetic or optical read-write heads 44. Extending between forward body portion 42 and rear body portion 43 are three spaced, elongated struts 46, 48, 50. Near the rear ends of these struts is mounted an electrically conductive coil 52. The uppermost strut 46 supports an upwardly extending, centrally located support roller 54 which contacts upper support rail assembly 38, as seen most clearly in FIGS. 3 and 4. The forward and rear body portions respectively support downwardly extending support rollers 58, 56 which contact lower support rail assemblies 36, 34.

In the assembled apparatus, as seen in FIG. 3, a pair of elongated, rectangular bar-shaped pole pieces 60, 62 are positioned between struts 46, 48 and 48, 50 respectively. Pairs of magnets 61, 63 are provided outside carriage 40 on both sides of pole pieces 60, 62. Magnets 61, 63 may be permanent or electromagnetic, as will be understood by those in the art, and are positioned so that their fields will interact with that generated by coil 52 when the coil is electrically energized. Magnets 61, 63 are attached to and are positioned by a pair of side plates 64, 66, each of which has suitable sets of pins 68 which engage corresponding sockets 70 in pole pieces 60, 62 after the pole pieces have been inserted between the struts 46–50.

Along their axially extending upper and lower edges, side plates 64, 66 include upper, central relief notches 72 and lower, axially spaced relief notches 74, 76. In the assembled apparatus, notches 72–76 provide clearance between side plates 64, 66 and the central portions of support rail assemblies 34–38 on which rollers 54–58 ride. However, adjacent to relief notches 72–76, side plates 64, 66 firmly engage resilient end bushings 78 provided at the opposite ends of the support rails, as will be discussed with regard to FIGS. 3-7. Side plates 64, 66 are clamped to and resiliently supported by bushings 78 by means of suitable fasteners 80, shown schematically in phantom in FIGS. 3 and 7. As a result of the resilient support of side plates 64, 66 on bushings 78, the axially directed reaction forces arising in magnets 61, 63 are attenuated effectively so that substantially no vibrations are transmitted to frame 32. As used in this specification, the term "axial" refers to movements or forces generally parallel to the path or axis of movement of carriage 40.

Figure 6:
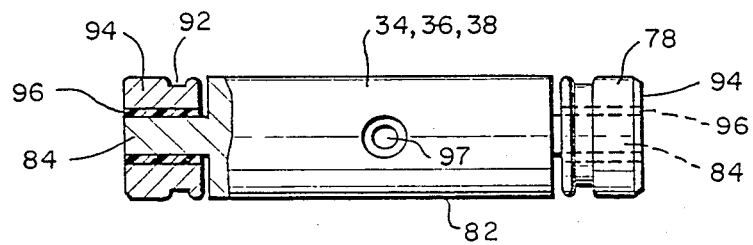

As seen in FIGS. 5 and 6, each of the support rail assemblies 34–38 comprises an essentially right circular cylindrical central portion 82 having a pair of oppositely, axially extending end portions 84 on which resilient bushings 78 are mounted. In the preferred embodiment illustrated in FIG. 5, resilient bushings 78 comprise an inner metal sleeve 86 sized to be press fitted onto end portions 84, an outer metal sleeve 88 spaced radially from inner sleeve 86 and a layer 90 of elastomeric material extending between and attached to sleeves 86, 88 by bonding or adhesive or friction. Bonding is preferred, however. Outer sleeve 88 also comprises a circumferentially extending groove 92 whose purpose will be explained subsequently. Alternatively, as shown in FIG. 6, resilient bushing 78 may comprise an outer sleeve 94 spaced radially from end portions 84 and a layer 96 of elastomeric material extending between and attached to end portion 84 and sleeve 94 by bonding or adhesive or friction. However, this latter embodiment is somewhat more difficult to manufacture than that of FIG. 5. In both embodiments, a tapped hole 97 is provided at the center of central portion 82 for the purpose of attaching the rail assembly to frame 32, as indicated schematically in FIG. 3.

Figure 7:
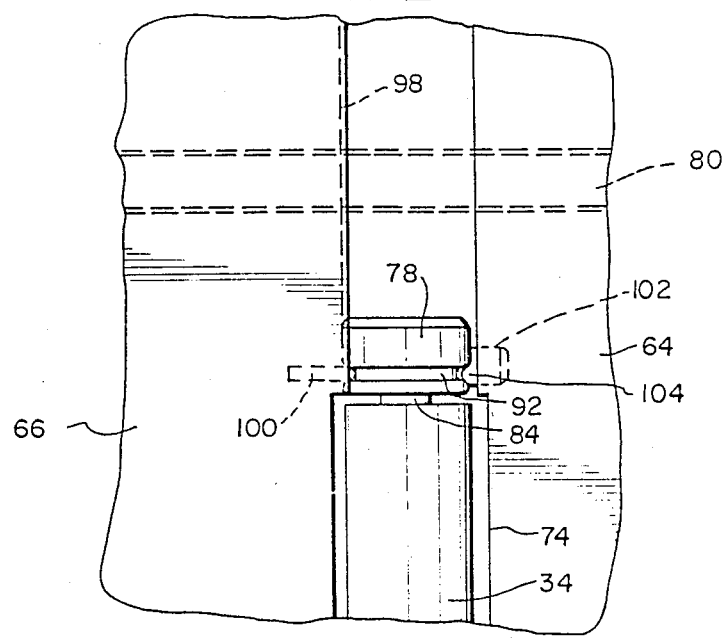
FIG. 7 shows a fragmentary view taken along line 7—7 of FIG. 3, indicating the cooperation between the resilient bushings and the side plates of assembled apparatus.

As shown in FIGS. 2, 3 and 7, side plate 66 comprises on either side of its relief notches 72–76 an axially extending groove 98 in which the resilient bushings 78 are cradled in the assembled device. Within groove 98 adjacent to at least one resilient bushing 78 on each of rail assemblies 34–38 is an outwardly extending pin 100 which extends into the circumferentially extending groove 92 of the adjacent resilient bushing 78. These pins ensure proper location of side plates 64, 66 on bushings 78. On the other side of the resilient bushings 78, side plate 64 is provided with a small socket 102 in which an elastomeric pad 104 is positioned to bear on bushing 78 opposite to pin 100. Pins 100 axially position side plates 64, 66 relative to resilient bushings 78, while pads 104 are provided to allow for adverse tolerance stack-ups which might prevent side plates 64, 66 from firmly engaging resilient bushings 78. The clamping force exerted by fasteners 80 on side plates 64, 66 and on bushings 78 ensures that any axial movement of side plates 64, 66 is transmitted directly to the resilient bushings.

In one actual embodiment of the rail assembly shown in FIG. 5, all parts other than layer 90 were made from stainless steel. The compliance of the elastomeric material was chosen to allow side plates 64, 66 to vibrate axially, without transmitting significant vibration to rail assemblies 34, 38. The dimensions of the parts can be adjusted as needed to avoid transmitting vibrations at a frequency which would be especially harmful to proper operation of the disk file. Those skilled in the art will understand, of course, that the dimensions and materials of the rail assembly may be varied as necessary to meet the load carrying capacity and vibration damping requirements of a given disk file actuator, without departing from the scope of our invention.

Figure 8:
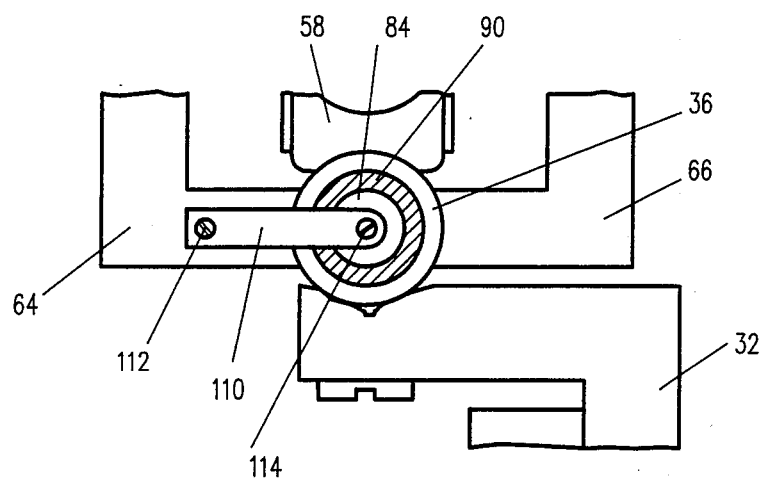
FIG. 8 is an end view of the side plate 64 and guide rail 36 illustrating a flexure element for mechanical stability.

In certain instances, it may be desirable to provide flexure elements which are directly connected to the end portions of the guide rails and to the magnet positioning means. Referring now to FIG. 8, there is illustrated such a modification to the present invention. A typical flexure element 110, which is preferably a thin stainless steel strip, has an opening at one end and is secured to side plate 64 by means of machine screw 112. The flexure element 110 is secured to the end portion 84 of quide rail 36 by means of machine screw 114 which is threaded into an axially threaded bore in the center of end portion 84. The flexure element 110 shown in FIG. 8 is representative of a typical flexure element for each corresponding guide rail. In the preferred embodiment each of the guide rails 34, 36, 38 has a similar flexure element interconnecting one of its respective end portions with an associated side plate. The flexure elements provide mechanical stability between side plates 64, 66 and guide rails 34, 36, 38 to substantially prevent movement relative to one another in a direction perpendicular to the access direction of the actuator. The flexure elements are thin strips of material so as to permit slight axial movement between the central portions of the guide rails 34, 36, and 38 and the side plates 64, 66. In this manner, the flexure elements assist the elastomeric material in returning the magnet structure to its proper axial position relative to the guide rails following actuation of the actuator.

While our invention has been described with reference to particular embodiments thereof, those skilled in the art will understand that various other variations in the form and detail of the apparatus may be made without departing from the spirit and scope of our invention.

Having thus described our invention in sufficient detail to enable those skilled in the art to make and use it, we claim as new and desire to secure Letters Patent for:

1. An actuator for moving a read or write head to selected tracks on a disk in a data recording disk file of the type having a frame supporting the actuator, the actuator comprising:

a movable carriage for supporting and moving the head;

an electrically conductive coil mounted on the carriage;

at least two carriage guide rails generally rigidly secured to the frame;

means attached to the carriage for supporting the carriage on the guide rails during movement;

at least two magnets for generating a magnetic field;

means secured to the magnets for positioning the magnets for electromagnetic interaction with the coil to cause the carriage to move along the guide rails upon electrical actuation of the coil; and means resiliently connecting the magnet positioning means to the carriage guide rails for attenuating reaction forces acting on the magnets in a direction opposite the direction of movement of the carriage when the coil is electrically actuated, said resiliently connecting means substantially supporting said magnet positioning means, whereby the carriage guide rails and the disk file frame to which they are generally rigidly secured are substantially isolated by said resiliently connecting means from the effect of the reaction forces on the magnets.

2. Apparatus according to claim 1, wherein the means for supporting the carriage further comprises a plurality of rollers mounted on the carriage in contact with the guide rails.

3. Apparatus according to claim 1, wherein each of the guide rails further comprises an elongated central portion mounted on the frame and extending parallel to the path of the movable carriage for engagement with the means for supporting the carriage, and axially and oppositely extending end portions, and wherein the means for attenuating the reaction forces is attached to the end portions.

4. Apparatus according to claim 3, wherein the means for attenuating the reaction forces further comprises a plurality of bushings, each bushing surrounding an associated end portion, and elastomeric material extending between each bushing and associated end portion.

5. Apparatus according to claim 4 further comprising a plurality of flexure elements, each flexure element having one end directly attached to one end portion of a respective guide rail and its other end directly attached to the positioning means.

6. Apparatus according to claim 5, wherein the magnet positioning means further comprises a pair of plate members disposed on either side of the carriage, the plate members including means for engaging the bushings.

7. Apparatus according to claim 6, wherein at least one of the bushings has a circumferentially extending groove, and wherein the bushing engaging means further comprises at least one pin in at least one of the plate members extending into the groove, and means for clamping the plate members to the bushings.

8. Apparatus according to claim 7, wherein the bushing engaging means further comprises an elastomeric pad in the other of the plate members opposite said at least one pin.

9. Apparatus according to claim 3, wherein the reaction force attenuating means further comprises a first inner bushing surrounding and engaging each of said end portions, a second outer bushing surrounding and radially spaced from each of said first inner bushings, and elastomeric material extending between said first and second bushings.

10. In a read or write head actuator attached to a frame of a data recording disk file, the actuator being of the type having a movable carriage for supporting and moving the head, an electrically conductive coil mounted on the carriage, at least two carriage guide rails spaced on opposite sides of the carriage and generally rigidly secured to the disk file frame, each of the guide rails having a longitudinal axis generally parallel to the direction of movement of the carriage, means attached to the carriage for supporting the carriage on the guide rails, and a-magnet structure for generating a magnetic field through the electrically conductive coil, an improvement for attenuating the reaction force on the magnet structure caused by movement of the carriage when the coil is electrically actuated, the improvement comprising:

means located between each of the guide rails and the magnet structure for resiliently connecting the magnet structure to the guide rails, said resiliently connecting means substantially supporting said magnet structure, whereby a substantial portion of the reaction force acting on the magnet structure in a direction opposite the direction of movement of the carriage is isolated by the resiliently connecting means from the guide rails and the frame to which the guide rails are generally rigidly secured.

11. The improvement according to claim 10 wherein the connecting means further comprises at least two bushings for each guide rail, each bushing being generally concentric with the longitudinal axis of its associated guide rail and generally rigidly secured to the magnet structure, and elastomeric material located between each of the bushings and its associated guide rail.

12. The improvement according to claim 11 further comprising a plurality of flexure elements, each flexure element having one end directly attached to an end of a respective guide rail and its other end directly attached to the magnet structure, said flexure elements providing mechanical stability between said magnet structure and said guide rails in a direction generally perpendicular to the movement of the carriage.

* * * * *